May 6, 1941.   R. FOLK, SR., ET AL   2,240,908
TOOL FOR SEGMENTING CITRUS FRUITS
Original Filed April 13, 1938
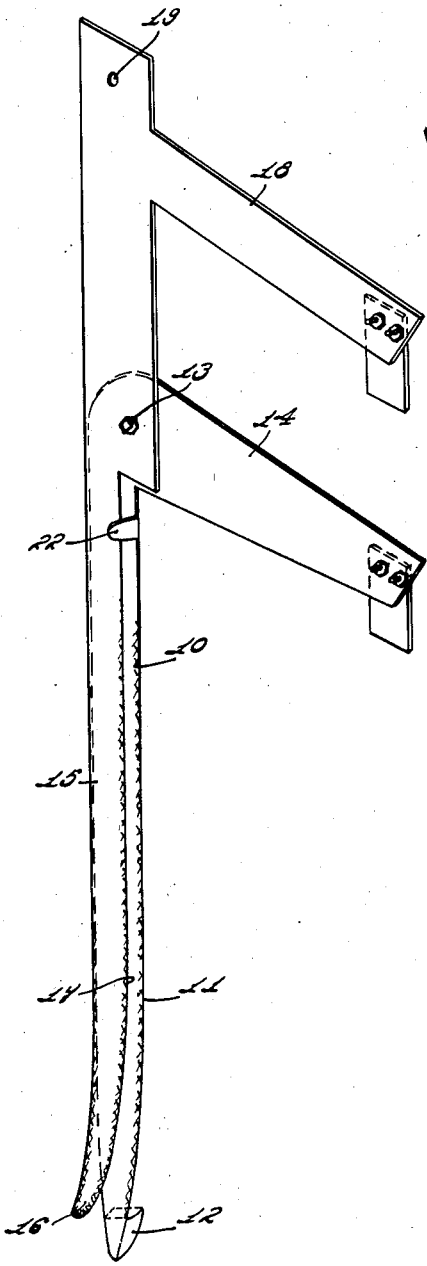
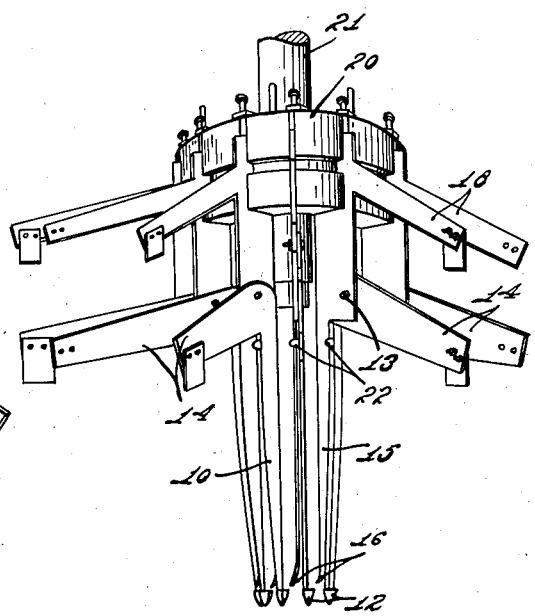
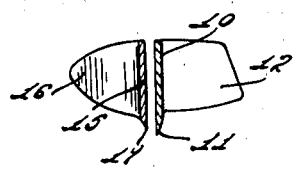
INVENTOR.
Ralph Folk Sr. and
Ralph Folk Jr.,
BY Hood & Hahn
ATTORNEYS.

Patented May 6, 1941

2,240,908

UNITED STATES PATENT OFFICE 2,240,908

TOOL FOR SEGMENTING CITRUS FRUITS

Ralph Polk, Sr., Miami, and Ralph Polk, Jr., Haines City, Fla., assignors to The Polk Development Company, Tampa, Fla., a copartnership of Florida Original application April 13, 1938, Serial No. 201,732. Divided and this application June 7, 1939, Serial No. 277,845

4 Claims. (Cl. 146—3)

This application is a division from our application Serial No. 201,732 filed April 13, 1938 which has matured into Patent 2,199,345, April 30, 1940, and is directed to the subject matter illustrated in Figs. 5 and 6 of that application.

In order to can the meat of citrus fruits, it is desirable that the segmental juice-cell groups be substantially unbroken and free from their inedible integument envelopes. To that end, the radial portions of such integuments must be separated from their juice-cell groups to which they are bonded.

One method of procedure involves the mechanical peeling of the fruit to remove not only the skin but also the major portion of the circumferential portions of the integuments which envelope the individual juice-cell groups, and thereafter, the formation of voids, extending parallel with the polar axis of the fruit, in the apices of the radially extending integuments, thereby extracting the seeds, if they exist, and removing a small portion of the meat at the apices of most of the juice-cell groups. Our present invention relates to a tool, one blade of which may be projected into and through the void between the radially extending portions of one integument and the other blade of which will enter the void in the apex of an immediately adjacent pair of radial integuments, the two blades thereby straddling two adherent radial adjacent integuments, whereupon one or both of the blades may be swung outwardly substantially in the bonding planes, to separate the meat of a juice-cell group from its bonded integument without substantial rupture of the juice-cells at the face of the group.

An individual tool may be projected successively through different segments of the fruit or a circular series of such tools may be so arranged as to simultaneously enter the fruit.

The accompanying drawing illustrates our invention.

Fig. 1 is a perspective view of one of the tools;

Fig. 2 a perspective view of a circular series of such tools; and

Fig. 3 a transverse section through the two blades of the tool.

In the drawing 10 indicates a narrow thin blade sharpened along one edge 11 and provided, at its tip, with laterally extended lug 12 longitudinally tapered. Blade 10 is provided, at its upper end, with a pivot point 13 and the laterally extended arm 14 by means of which the blade may be swung. Paralleling blade 10 is a narrow, thin blade 15 which, at its lower end, has an outturned tip 16, the lateral extent of which is less than the width of an average fruit section a short distance outwardly from the apex thereof. Blade 15 is sharpened along one edge 17 and blade 14 is pivoted thereto at 13. The upper end of blade 15 is provided with a laterally extending arm 18 and a pivot point 19 by means of which it may be pivotally mounted in a cylindrical head 20 to swing in a radial plane relative to said head. The head 20 is provided with an actuating stem 21 and carries, preferably, about half as many tools as there are fruit segments in an average fruit.

Blade 10, near its root, is provided with a laterally extending finger 22 which overlies the adjacent edge of blade 15.

Blade 10 is slightly longer than blade 15 so that in a circular series of tools the outturned tip 16 of blade 15 will overlie the upper end of the lug 12 of the adjacent blade 10 of the adjacent tool. In use, the tip 12 is inserted into the fruit within and close to the apex of the V-shaped integument of a fruit section, the tapered lug 12 serving to position blade 10 substantially in the bonding plane of one radial arm of the V-shaped integument enveloping that fruit section, while the outturned tip 16 of the adjacent blade 15 insures that the blade 15 will enter the next adjacent fruit segment, in the apex between the V-shaped integument of that next adjacent segment. When the tips of the two blades have been passed through the fruit, the blades may be swung outwardly, radially of the fruit, so that the blades will rupture the bond between the radially extending integument portions and the adjacent juice-cell groups. If the outwardly acting force is applied to blade 15, the two blades 15 and 10 will move together because of the overlying finger 22 and thus simultaneously break the bonds between the adjacent juice-cell groups and an adherent pair of radially extending integument portions. As such an action is likely to too greatly stress the fruit, tending to break the bonds between the adjacent integument portions, we deem it preferable, after the tool has penetrated the fruit, to first swing the blade 10 outwardly and thereafter the blade 15 outwardly.

Generally the above-described tools are to be used in a circular group and when so used, the peeled fruits are preferably impaled upon a fork composed of a circular series of small tines parallel to the axis of the series and circumferentially spaced at a radial distance such that the tines will enter the fruit immediately within the apices of the integuments so that the fork not only supports the fruit but the tines serve to hold the V-shaped integuments against radial displacement during the outward swinging of the blades of the tool.

We claim as our invention:

1. A tool for rupturing the natural-bond between one side of a juice-cell group of a fruit of the natural citrus type and the adherent radial integument, comprising two thin closely parallel blades held together in that relation, one blade having a laterally projecting tapered lug at its tip beyond the tip of the other blade and upon its face opposite said other blade, the said other blade having its tip bent outwardly away from the first-mentioned blade.

2. A circumferential group of tools of the character described in the immediately preceding claim, arranged about a common axis with the outwardly curved tip of one blade of each pair overlying the laterally extending lug of the lug-bearing blade of an adjacent pair.

3. A tool of the character specified in claim 1 wherein the blade which carries the lug is pivoted at its root to swing relative to the companion blade in substantial parallelism therewith.

4. A tool of the character specified in claim 1 wherein the blade which carries the lug is pivoted at its root to swing relative to the companion blade in substantial parallelism therewith, said pivoted blade having a portion near its root laterally overlying the companion blade to limit swing of the pivoted blade in one direction.

RALPH POLK, Sr.
RALPH POLK, Jr.